United States Patent
LaRose, Jr. et al.

(10) Patent No.: US 8,327,621 B2
(45) Date of Patent: Dec. 11, 2012

(54) OXIDATION CATALYST OUTLET TEMPERATURE CORRECTION SYSTEMS AND METHODS

(75) Inventors: Thomas LaRose, Jr., Redford, MI (US); Jason Daniel Mullins, Brighton, MI (US); Eric R. Snyder, Waterloo, IA (US); Paul Jasinkiewicz, Northville, MI (US); James M. Perrin, Livonia, MI (US); Sarah Funk, Canton, MI (US)

(73) Assignee: GM Global Technology Operations LLC

( * ) Notice: Subject to any disclaimer, the term of this patent is extended or adjusted under 35 U.S.C. 154(b) by 857 days.

(21) Appl. No.: 12/427,930

(22) Filed: Apr. 22, 2009

(65) Prior Publication Data

US 2010/0269489 A1  Oct. 28, 2010

(51) Int. Cl.
*F01N 3/00* (2006.01)
*F01N 3/10* (2006.01)
*F01N 3/02* (2006.01)

(52) U.S. Cl. ............... 60/286; 60/295; 60/299; 60/300; 60/311

(58) Field of Classification Search ............ 60/274, 60/285, 286, 295, 297, 299, 300, 301, 311
See application file for complete search history.

(56) References Cited

U.S. PATENT DOCUMENTS

| | | | | |
|---|---|---|---|---|
| 6,758,037 | B2 * | 7/2004 | Terada et al. | 60/295 |
| 7,104,049 | B2 * | 9/2006 | Hiranuma et al. | 60/295 |
| 2004/0098973 | A1 * | 5/2004 | Tennison et al. | 60/286 |
| 2005/0039442 | A1 * | 2/2005 | Ishibashi et al. | 60/285 |
| 2005/0241301 | A1 * | 11/2005 | Okugawa et al. | 60/295 |
| 2009/0024305 | A1 * | 1/2009 | Ishikawa | 701/103 |
| 2009/0113878 | A1 * | 5/2009 | Marcelot et al. | 60/286 |
| 2010/0132334 | A1 * | 6/2010 | Duclos et al. | 60/286 |

FOREIGN PATENT DOCUMENTS

WO   WO 2007116163 A1 * 10/2007

OTHER PUBLICATIONS

U.S. Appl. No. 12/244,976, filed Oct. 3, 2008, Mullins et al.

* cited by examiner

*Primary Examiner* — Thomas Denion
*Assistant Examiner* — Audrey K Bradley

(57) ABSTRACT

A temperature control system comprises a temperature determination module, a temperature correction module, a temperature control module, and an updating module. The temperature determination module determines a desired outlet temperature for an oxidation catalyst (OC) that is located upstream of a particulate filter (PF) in an exhaust system. The temperature correction module determines a temperature correction from a plurality of temperature corrections. The temperature control module controls an outlet temperature of the OC based on the desired outlet temperature and the temperature correction. The updating module selectively updates at least one of the plurality of temperature corrections when an engine speed and an engine load are within respective predetermined ranges.

24 Claims, 4 Drawing Sheets

OXIDATION CATALYST OUTLET TEMPERATURE CORRECTION SYSTEMS AND METHODS

CROSS-REFERENCE TO RELATED APPLICATIONS

This application is related to U.S. patent application Ser. No. 12/244,976 filed on Oct. 3, 2008. The disclosure of the above application is incorporated herein by reference in its entirety.

FIELD

The present disclosure relates to internal combustion engine systems and more particularly to exhaust temperature control.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air/fuel mixture to generate torque and propel a vehicle. Combustion of the air/fuel mixture produces exhaust that is expelled from an engine to an exhaust system. Exhaust systems associated with soot producing internal combustion engines, such as diesel-type engines or direct injection engines, include a treatment system that treats the exhaust before the exhaust is expelled from the exhaust system.

The treatment system may include one or more injectors that inject a fluid into the exhaust system. For example, exhaust systems having an oxidation catalyst (OC) may include a hydrocarbon (HC) injector that injects a HC fluid (e.g., fuel) upstream of the OC. Once the OC reaches a predetermined temperature, injected HC may be combusted by the OC. Exhaust systems having a selective catalytic reduction (SCR) catalyst generally include a dosing agent injector that injects a dosing fluid (e.g., urea) upstream of the SCR catalyst. The SCR catalyst selectively absorbs the dosing fluid and reduces nitrogen oxides (NOx) passing the SCR catalyst.

SUMMARY

A temperature control system comprises a temperature determination module, a temperature correction module, a temperature control module, and an updating module. The temperature determination module determines a desired outlet temperature for an oxidation catalyst (OC) that is located upstream of a particulate filter (PF) in an exhaust system. The temperature correction module determines a temperature correction from a plurality of temperature corrections. The temperature control module controls an outlet temperature of the OC based on the desired outlet temperature and the temperature correction. The updating module selectively updates at least one of the plurality of temperature corrections when an engine speed and an engine load are within respective predetermined ranges.

In other features, the updating module selectively updates the at least one of the plurality of temperature corrections based on a difference between a measured outlet temperature of the OC and the desired outlet temperature.

In still other features, the updating module updates one of the plurality of temperature corrections that corresponds to the engine speed and the engine load.

In further features, the temperature correction module determines the temperature correction from the plurality of temperature corrections based on the engine speed and the engine load.

In still further features, the temperature correction module determines the temperature correction from the plurality of temperature corrections based on exhaust flow rate.

In other features, the temperature control system further comprises an enabling/disabling module. The enabling/disabling module disables the updating module when at least one of the engine speed and the engine load are outside of the respective predetermined ranges.

In still other features, the enabling/disabling module disables the updating module when a change in a desired PF inlet temperature over a predetermined period is greater than a predetermined amount.

In further features, the enabling/disabling module disables the updating module when a change in a desired OC outlet temperature over a predetermined period is greater than a predetermined amount.

In still further features, the temperature control module controls the outlet temperature of the OC based on a sum of the desired outlet temperature and the temperature correction.

In other features, the temperature control system further comprises an injection control module. The injection control module controls hydrocarbon (HC) injection upstream of the OC to control the outlet temperature of the OC.

A system comprises the treatment control system, the OC, the PF, and a selective catalytic reduction (SCR) catalyst. The SCR catalyst is disposed in the exhaust system between the OC and the PF.

A temperature control method comprises: determining a desired outlet temperature for an oxidation catalyst (OC) that is located upstream of a particulate filter (PF) in an exhaust system; determining a temperature correction from a plurality of temperature corrections; controlling an outlet temperature of the OC based on the desired outlet temperature and the temperature correction; and selectively updating at least one of the plurality of temperature corrections when an engine speed and an engine load are within respective predetermined ranges.

In other features, the selectively updating comprises selectively updating the at least one of the plurality of temperature corrections based on a difference between a measured outlet temperature of the OC and the desired outlet temperature.

In still other features, the selectively updating comprises updating one of the plurality of temperature corrections that corresponds to the engine speed and the engine load.

In further features, the temperature control method further comprises determining the temperature correction from the plurality of temperature corrections based on the engine speed and the engine load.

In still further features, the temperature control method further comprises determining the temperature correction from the plurality of temperature corrections based on exhaust flow rate.

In other features, the temperature control method further comprises disabling the selectively updating when at least one of the engine speed and the engine load are outside of the respective predetermined ranges.

In still other features, the temperature control method further comprises disabling the selectively updating when a change in a desired PF inlet temperature over a predetermined period is greater than a predetermined amount.

In further features, the temperature control method further comprises disabling the selectively updating when a change in a desired OC outlet temperature over a predetermined period is greater than a predetermined amount.

In still further features, the temperature control method further comprises controlling the outlet temperature of the OC based on a sum of the desired outlet temperature and the temperature correction.

In other features, the temperature control method further comprises controlling hydrocarbon (HC) injection upstream of the OC to control the outlet temperature of the OC.

In still other features, a selective catalytic reduction (SCR) catalyst is disposed in the exhaust system between the OC and the PF.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
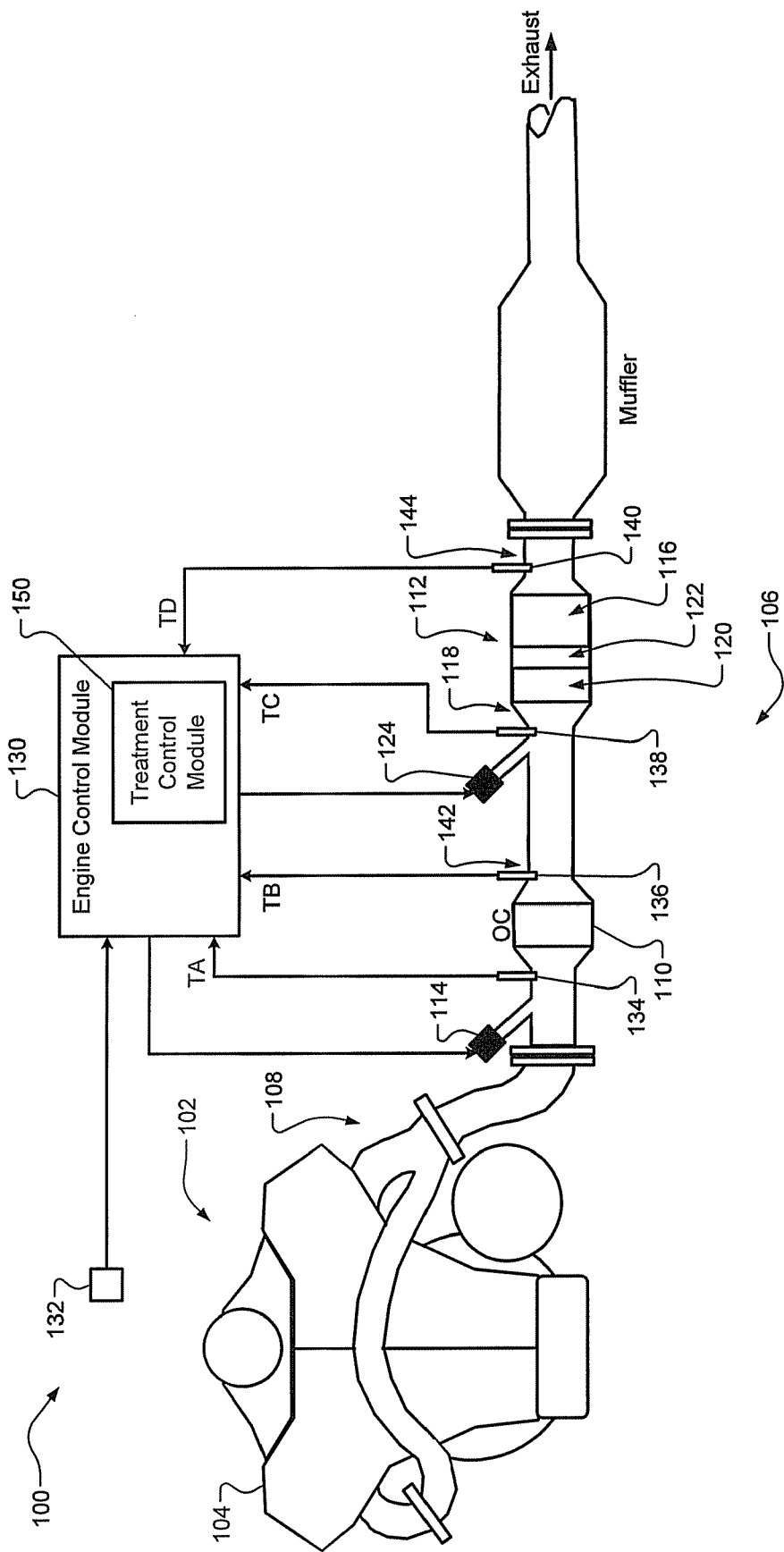
FIG. 1 is a functional block diagram of an exemplary vehicle system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an application specific integrated circuit (ASIC), an electronic circuit, a processor (shared, dedicated, or group) and memory that executes one or more software or firmware programs, a combinational logic circuit, and/or other suitable hardware components that provide the described functionality.

A temperature control system controls injection of a hydrocarbon (HC) fluid (e.g., fuel) into an exhaust system upstream of an oxidation catalyst (OC). The temperature control system controls the HC injection based on a desired outlet temperature for the OC. The desired outlet temperature corresponds to an estimated outlet temperature of the OC for adjusting an inlet temperature of a particulate filter (PF) to a desired inlet temperature. In this manner, the temperature control system controls HC injection to adjust the PF inlet temperature to the desired inlet temperature.

In some circumstances, the desired outlet temperature may vary from an actual outlet temperature that adjusts the PF inlet temperature to the desired inlet temperature. For example, aging of the OC, poisoning of the OC, and/or exhaust system or component differences may cause such variations.

The temperature control system of the present disclosure selectively determines a temperature correction for the desired outlet temperature based on a difference between the desired outlet temperature and a measured outlet temperature. The temperature control system adjusts the desired OC outlet temperature based on the temperature correction. In this manner, the temperature control system controls HC injection to account for the temperature correction and to create the desired PF inlet temperature.

Referring now to FIG. 1, a functional block diagram of an exemplary vehicle system 100 is presented. The vehicle system 100 includes a diesel engine system 102. The diesel engine system 102 is described and shown for purposes of illustration only. The present disclosure is also applicable to other types of engine systems, such as gasoline engine systems, homogenous charge compression ignition engine systems, direct-injection engine systems, hybrid engine systems, and/or other types of engine systems.

The diesel engine system 102 includes an engine 104 that combusts a mixture of air and diesel fuel to produce torque. Exhaust resulting from combustion of the air/fuel mixture is expelled from the engine 104 to an exhaust system 106. The exhaust system 106 includes an exhaust manifold 108, an oxidation catalyst (OC) 110, and a particulate filter (PF) assembly 112. The exhaust system 106 may also include an exhaust gas recirculation (EGR) system (not shown) that re-circulates a portion of the exhaust back to the engine 104.

The exhaust flows from the engine 104 through the exhaust manifold 108 to the OC 110. For example only, the OC 110 may include a diesel oxidation catalyst (DOC). The OC 110 oxidizes particulate in the exhaust as the exhaust flows through the OC 110. For example only, the OC 110 may oxidize particulate, such as hydrocarbons and/or carbon oxides of the exhaust. The OC 110 may also react with nitrogen monoxide (NO) in the exhaust to produce nitrogen dioxide ($NO_2$).

The exhaust system 106 may also include a hydrocarbon (HC) injector 114 that is located upstream of the OC 110. The HC injector 114 injects a HC fluid (e.g., fuel) into the exhaust system 106. For example only, the HC fluid may include the fuel combusted within the engine 104. Once the OC 110 reaches a predetermined temperature (e.g., 250.0° C.), injected HC combusts and produces heat.

The PF assembly 112 includes a PF 116 that filters particulate from the exhaust and traps particulate. For example only, the PF 116 may include a diesel particulate filter (DPF). Particulate accumulates within the PF assembly 112 over time. Accumulated particulate restricts the exhaust flow through the PF 116 and the PF assembly 112. Accumulated particulate may be removed (e.g., burned) from the PF assembly 112 by a process referred to as regeneration.

Regeneration may be accomplished by, for example, heat provided by combustion of injected HC upstream of the PF 116. In some engine systems, a heater and/or another device (not shown) may also be implemented to provide heat near an inlet 118 of the PF assembly 112. Regeneration may begin, and particulate may begin combusting, at temperatures greater than a predetermined regeneration temperature (e.g., approximately 560.0° C.).

Combustion of particulate near the inlet 118 generates heat. Heat generated near the inlet 118 is carried downstream by the exhaust and causes further combustion. In this manner, particulate combustion beginning near the inlet 118 cascades and burns particulate throughout the PF assembly 112.

The exhaust system 106 may also include a selective catalytic reduction (SCR) catalyst 120 that is located upstream of the PF 116. In some exhaust systems, such as the exhaust system 106, a buffer 122 may be located between the SCR catalyst 120 and the PF 116. The SCR catalyst 120 absorbs ammonia ($NH_3$) provided by a dosing agent (e.g., urea) injected by a dosing agent injector 124. The SCR catalyst reacts with nitrogen oxides ($NO_X$) and/or other components in the exhaust. In this manner, the SCR catalyst 120 reduces the amount of $NO_X$ emitted from the exhaust system 106.

An engine control module (ECM) 130 controls torque output by the engine 104. The ECM 130 may control the torque output based on parameters measured by sensors 132. The sensors 132 may include, for example, an accelerator pedal position sensor, a mass airflow (MAF) sensor, an intake air temperature (IAT) sensor, an engine coolant temperature sensor, an oil temperature sensor, a manifold absolute pressure sensor (MAP), and/or other sensors.

The ECM 130 may also adjust one or more engine parameters based on parameters measured by one or more sensors associated with the exhaust system 106. The sensors associated with the exhaust system 106 may include, for example, temperature sensors, oxygen sensors, NOx sensors, $NH_3$ sensors, exhaust flow rate (EFR) sensors, and/or other sensors.

For example only, the ECM 130 may receive exhaust system temperatures from first, second, third, and fourth exhaust temperature sensors 134, 136, 138, and 140, respectively. The first exhaust temperature sensor 134 measures temperature of the exhaust upstream of the OC 110 and outputs a signal (TA) accordingly.

The second exhaust temperature sensor 136 measures temperature near an OC outlet 142 (i.e., OC outlet temperature) and outputs a signal (TB) accordingly. The third exhaust temperature sensor 138 measures temperature near the inlet 118 of the PF assembly 112 (i.e., PF inlet temperature) and outputs a signal (TC) accordingly. In various implementations, the third exhaust temperature sensor 138 may be located between the SCR catalyst 120 and the PF 116, such as in the buffer 122. The fourth exhaust temperature sensor 140 measures temperature downstream of the PF assembly 112 and generates a signal (TD) accordingly. For example only, the fourth exhaust temperature sensor 140 may measure temperature near a PF outlet 144.

As stated above, the ECM 130 controls torque output by the engine 104. For example only, the ECM 130 may adjust throttle opening, the amount of fuel supplied to the engine 104, and/or the timing of fuel injection to adjust the torque output of the engine 104. The ECM 130 may also adjust one or more operating parameters to provide desired exhaust conditions within the exhaust system 106.

The ECM 130 includes a treatment control module 150 that controls injection of HC into the exhaust system 106. The treatment control module 150 may also control other treatment measures associated with the exhaust system 106, such as injection of the dosing agent. While the treatment control module 150 is shown and described as being included within the ECM 130, the treatment control module 150 may be implemented independently from the ECM 130.

The treatment control module 150 controls HC injection to control the PF inlet temperature (i.e., TC) to a desired PF inlet temperature. For example only, the treatment control module 150 controls HC injection to adjust the PF inlet temperature to the regeneration temperature for PF regeneration. The treatment control module 150 controls the PF inlet temperature via the OC outlet temperature.

More specifically, the treatment control module 150 determines a desired OC outlet temperature and controls HC injection based on the desired OC outlet temperature. The desired OC outlet temperature corresponds to an estimated OC outlet temperature to increase the PF inlet temperature to the desired PF inlet temperature, such as the regeneration temperature. In this manner, the treatment control module 150 controls the PF inlet temperature to the desired PF inlet temperature. For example only, a desired OC outlet temperature of approximately 650° C. may correspond to a desired PF inlet temperature of 550° C.

The desired OC outlet temperature may, however, vary from an actual OC outlet temperature to adjust the PF inlet temperature to the desired PF inlet temperature. This variation may be attributable to, for example, aging of the OC 110, poisoning of the OC 110, and/or other sources of variation. System-to-system and/or part-to-part variations in components of the exhaust system 106 may also cause variation.

The treatment control module 150 of the present disclosure monitors the desired OC outlet temperature and the measured OC outlet temperature (i.e., TB). The treatment control module 150 determines and stores a temperature correction for the desired OC outlet temperature based on a difference between the desired and measured OC outlet temperatures when operating conditions are deemed steady and stable.

The treatment control module 150 may later adjust the desired OC outlet temperature based on the temperature correction. In this manner, the treatment control module 150 adjusts later HC injection control based on the temperature corrections to achieve the desired PF inlet temperature. Adjusting the desired OC outlet temperature based on the temperature correction minimizes the possibility of poisoning the OC 110, minimizes the possibility of increasing the PF inlet temperature above the desired PF inlet temperature, and assures that the PF inlet temperature reaches the desired PF inlet temperature as rapidly as possible.

Figure 2:
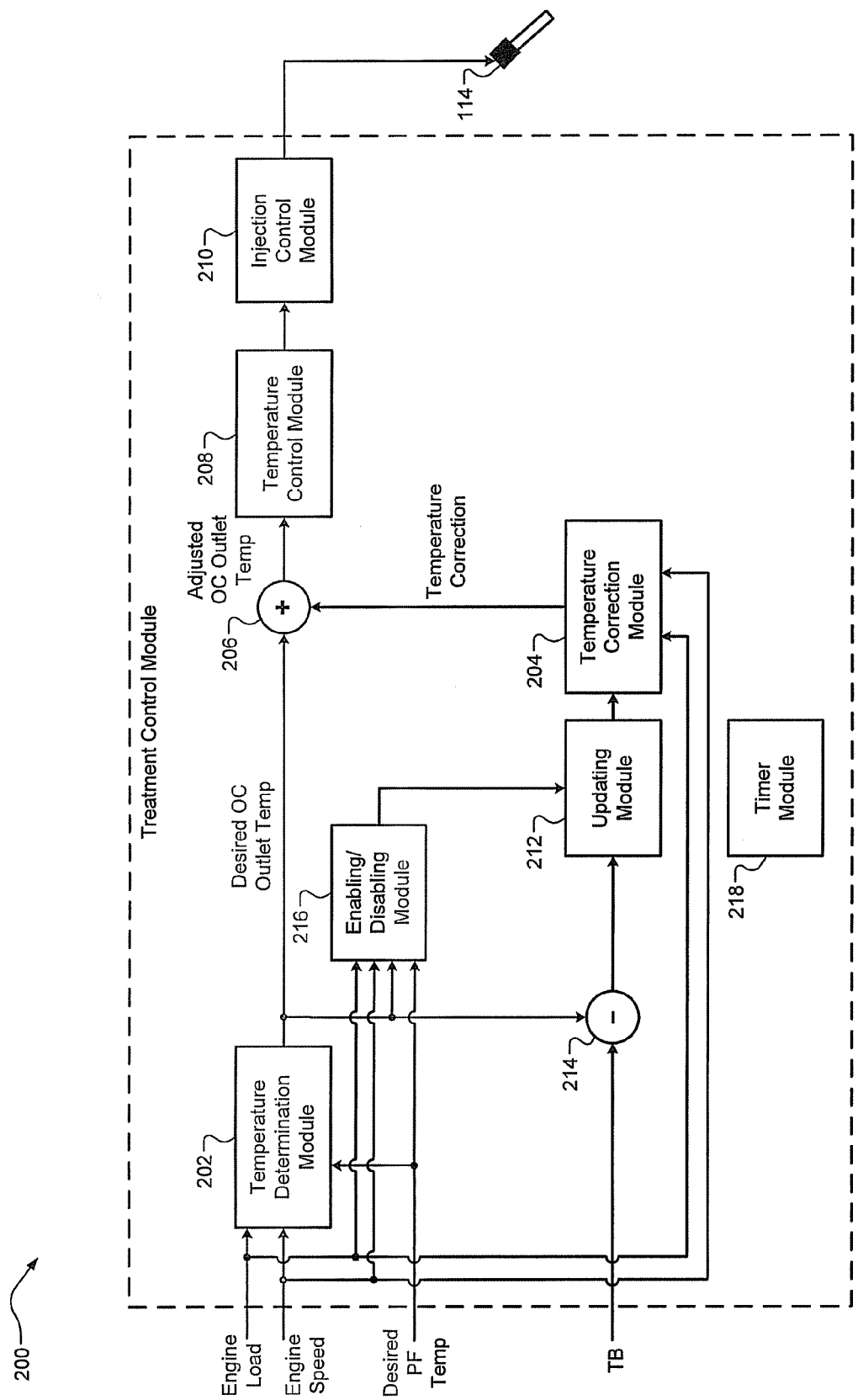
FIG. 2 a functional block diagram of an exemplary treatment control module according to the principles of the present disclosure.

Referring now to FIG. 2, a functional block diagram of an exemplary treatment control system 200 including the treatment control module 150 is presented. The treatment control module 150 includes a temperature determination module 202, a temperature correction module 204, a summer module 206, a temperature control module 208, and an injection control module 210. The treatment control module 150 also includes an updating module 212, a difference module 214, and an enabling/disabling module 216.

The temperature determination module 202 determines and outputs the desired OC outlet temperature. The temperature determination module 202 determines the desired OC outlet temperature based on engine speed and engine load. The temperature determination module 202 may also determine the desired OC outlet temperature based on the desired PF inlet temperature and/or other parameters. The desired PF inlet temperature corresponds to a desired temperature near or at the inlet of the PF assembly 112, such as the regeneration temperature.

The engine speed may be, for example, measured using an engine speed sensor (not shown). The engine load may be, for example, determined based on the amount of fuel being supplied to the engine 104 for combustion. For example only, the engine load increases as the amount of fuel supplied (i.e., injected) increases. In gasoline engine systems, engine load may be determined based on one or more engine airflow parameters, such as MAF, MAP, air per cylinder (APC), throttle opening, and/or other engine airflow parameters.

The temperature correction module 204 determines and outputs a temperature correction for the desired OC outlet temperature. The temperature correction module 204 determines the temperature correction based on engine speed and engine load. More specifically, the temperature correction module 204 determines the temperature correction from a mapping of temperature corrections that are indexed by engine speed and engine load. The mapping may be implemented within the temperature correction module 204 or in another suitable location, such as in non-volatile memory.

In other implementations, the mapping of temperature corrections may be indexed by exhaust flow rate (EFR). The EFR may be, for example, measured using an EFR sensor (not shown), determined based on one or more of the engine air flow parameters, and/or provided by another suitable source.

In various implementations, the engine speed and engine load from which the temperature correction is determined may be averaged over a predetermined period. For example only, the engine speed and engine load may be determined based on engine speed and engine load at a given time divided by respective averages of the engine speed and engine load over a predetermined period before that time.

The predetermined period may be calibratable and may be set, for example, based on the EFR. The predetermined period may decrease, for example, as the EFR increases. For example only, the predetermined period may be approximately 3.0 seconds for an EFR of 1400 kg/hour and approximately 1 minute for an EFR of 100 kg/hour.

The summer module 206 receives the desired OC outlet temperature and the temperature correction from the temperature determination module 202 and the temperature correction module 204, respectively. The summer module 206 determines an adjusted OC outlet temperature based on the desired OC outlet temperature and the temperature correction. For example only, the summer module 206 determines the adjusted OC outlet temperature based on a sum of the desired OC outlet temperature and the temperature correction.

The temperature control module 208 controls the OC outlet temperature (i.e., TB) based on the adjusted OC outlet temperature. More specifically, the temperature control module 208 commands HC injection based on the adjusted OC outlet temperature. The temperature control module 208 may command, for example, injection of an amount of HC.

For example only, the temperature control module 208 may command injection of HC at a mass flow rate (e.g., g/sec) over a period of time (sec) that corresponds to the amount of HC (g). The injection control module 210 receives the HC injection commands from the temperature control module 208 and applies signals to the HC injector 114 accordingly. In this manner, HC injection is controlled based on the adjusted OC outlet temperature including the temperature correction.

The difference module 214 determines a temperature difference based on a difference between the desired OC outlet temperature and the measured OC outlet temperature (i.e., TB). For example only, the temperature difference may be determined as the desired OC outlet temperature less the measured OC outlet temperature. In this manner, the temperature difference reflects both the magnitude of the temperature difference and whether the temperature difference is positive or negative.

The updating module 212 selectively updates the temperature correction mapping from which the temperature correction module 204 determines the temperature correction. The updating module 212 selectively updates the temperature correction mapping based on the temperature difference when the updating module 212 is enabled. More specifically, the updating module 212 updates the temperature correction of the temperature correction mapping corresponding to the engine load and engine speed.

For example only, the updating module 212 may update the temperature correction based on a sum the temperature difference and an existing entry of the temperature correction mapping. In other implementations, the updating module 212 may replace the existing entry with the temperature correction.

If an existing entry is not present for the engine speed and engine load, the updating module 212 may create a new entry for the temperature difference and store the temperature difference in the temperature correction mapping according to the engine speed and engine load. In this manner, the updating module 212 may populate the temperature correction mapping if a temperature correction is not present for the engine speed and engine load.

The enabling/disabling module 216 selectively enables and disables the updating module 212 based on whether operating conditions are steady and stable. More specifically, the enabling/disabling module 216 enables the updating module 212 based on the engine speed, the engine load, the desired OC outlet temperature, and the desired PF inlet temperature.

The enabling/disabling module 216 selectively enables the updating module 212 when the engine speed is within a predetermined range of speeds. The predetermined range of speeds may include, for example, speeds within a predetermined percentage (e.g., 5-10%) or amount (e.g., 5-10 rpm) of the average engine speed over the predetermined period. Accordingly, the enabling/disabling module 216 selectively enables the updating module 212 when the engine speed is within the predetermined range of speeds. Written another way, the enabling/disabling module 216 disables the updating module 212 when the engine speed is outside of the predetermined range of speeds.

The enabling/disabling module 216 also selectively enables the updating module 212 when the engine load is within a predetermined range of engine loads. The predetermined range of loads may include, for example, engine loads within a predetermined percentage (e.g., 5-10%) or amount (e.g., 5-10 cc fuel) of the average engine load over the predetermined period. Accordingly, the enabling/disabling module 216 selectively enables the updating module 212 when the engine load is within the predetermined range of engine loads. Written another way, the enabling/disabling module 216 disables the updating module 212 when the engine load is outside of the predetermined range of engine loads.

In various implementations, the enabling/disabling module 216 may start a steady-state timer when the engine speed and engine load are within the respective ranges. The steady-state timer may be implemented, for example, in a timer module 218 and/or in another suitable location. The enabling/disabling module 216 may reset the steady-state timer each time when disabling the updating module 212. The enabling/disabling module 216 may reset the steady-state timer to a predetermined reset value, such as zero.

The enabling/disabling module 216 also selectively enables the updating module 212 when a change in the desired OC outlet temperature over the predetermined period is less than a predetermined amount. For example only, the predetermined amount may be approximately 5% of the average of the desired OC outlet temperature over the predetermined period. Written another way, the enabling/disabling module 216 disables the updating module 212 when the desired OC outlet temperature changes more than the predetermined amount over the predetermined period.

The enabling/disabling module 216 also selectively enables the updating module 212 when a change in the desired PF inlet temperature over the predetermined period is less than a predetermined amount. For example only, the predetermined amount may be approximately 5% of the average of the desired PF inlet temperature over the predetermined period. Written another way, the enabling/disabling module 216 disables the updating module 212 when the desired PF inlet temperature changes more than the predetermined amount over the predetermined period.

The enabling/disabling module 216 may also start a stable temperature timer when the desired OC outlet temperature and the desired PF inlet temperature changes are less than the respective predetermined amounts. The stable temperature timer may be implemented, for example, in the timer module 218 and/or in another suitable location. The enabling/disabling module 216 may reset the stable temperature timer each time when disabling the updating module 212. The enabling/disabling module 216 may reset the stable temperature timer to a predetermined reset value, such as zero.

The enabling/disabling module may require that the steady-state timer and the stable temperature timer reach the predetermined period before enabling the updating module 212. As stated above, the predetermined period may be calibratable and may be set, for example, based on the EFR. The predetermined period may decrease, for example, as the EFR increases.

The updating module 212 updates the temperature correction mapping when the updating module 212 is enabled. The updating module 212 may also update the temperature correction mapping after each predetermined period of time while enabled. For example only, the updating module 212 may update the temperature correction mapping approximately every 30 seconds while enabled.

The temperature correction module 204 uses the updated/populated temperature correction mapping for later HC injection control. Controlling HC injection based on the updated/populated temperature correction mapping minimizes the possibility of poisoning the OC 110, minimizes the possibility of increasing the PF inlet temperature above the desired PF inlet temperature, and assures that the PF inlet temperature reaches the desired PF inlet temperature as rapidly as possible.

Figure 3:
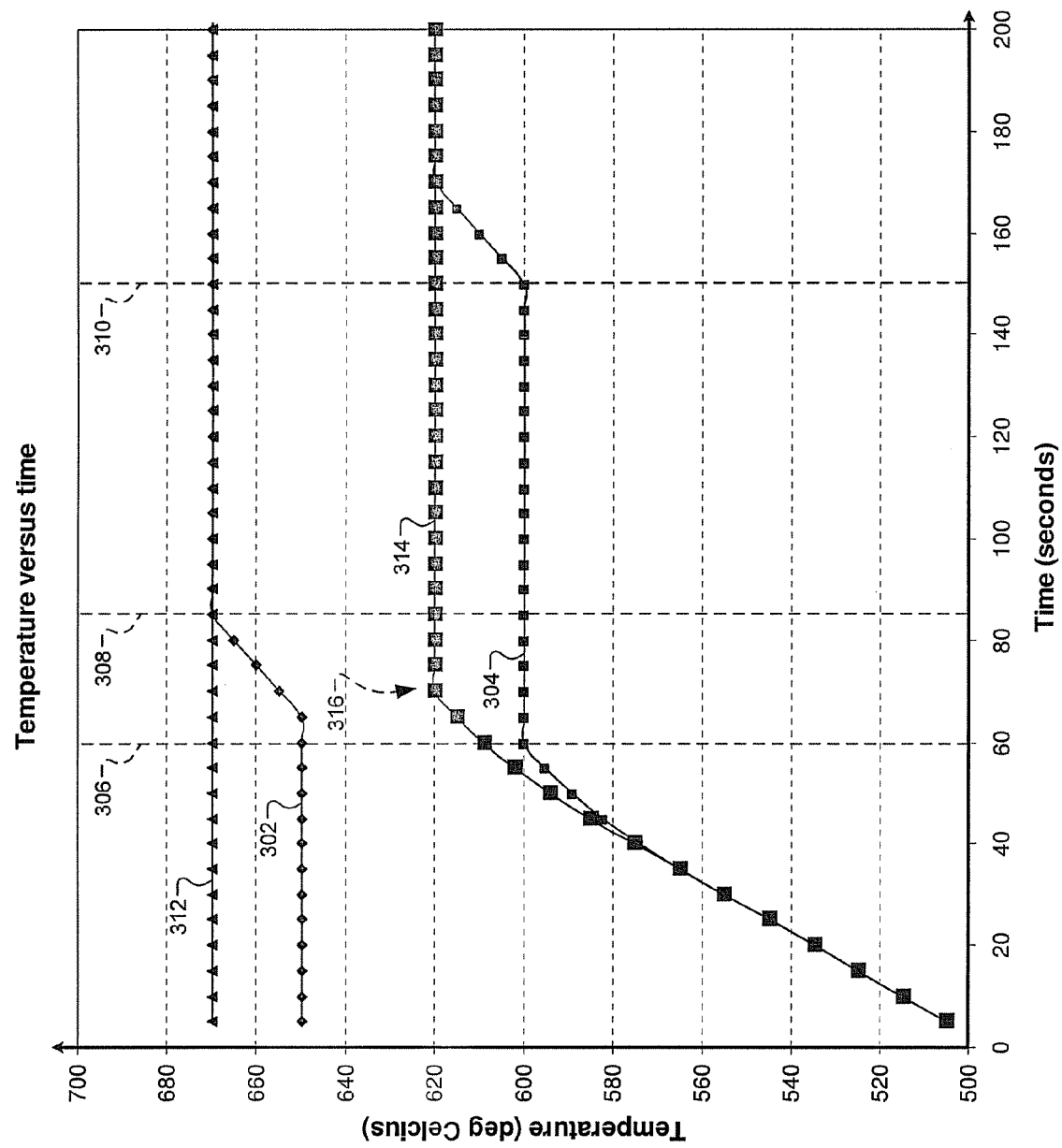
FIG. 3 is an exemplary graph of temperature versus time during operation of the treatment control module according to the principles of the present disclosure.

Referring now to FIG. 3, an exemplary graph of temperature versus time is presented. Trace 302 tracks the desired OC outlet temperature that is not adjusted based on a temperature correction. HC injection is controlled to control the OC outlet temperature to the desired OC outlet temperature 302. The injected HC combusts, providing heat downstream to the PF assembly 112.

Trace 304 tracks an exemplary measured PF inlet temperature (i.e., TC). The PF inlet temperature 304 increases as HC is combusted and heat is provided downstream of the OC 110. The slow increase in the PF inlet temperature 304 may be attributable to propagation delay for the heat to travel to the inlet 118 and/or to heat transferred to the SCR catalyst 120. The PF inlet temperature 304 plateaus after time 306, at approximately 60 seconds.

The treatment control module 150 would, if not for temperature correction, respond to feed-back regarding the plateauing PF inlet temperature 304 and increase the desired OC outlet temperature 302 after time 306 to achieve the desired PF inlet temperature (e.g., the regeneration temperature). The desired PF inlet temperature of FIG. 3 is approximately 620° C. The increased desired OC outlet temperature 302 after time 306 causes an increase in the amount of HC injected. The desired OC outlet temperature 302 reaches an increased temperature at time 308, at approximately 85 seconds.

The PF inlet temperature 304 plateaus until the heat provided by the increased HC injection begins increasing the PF inlet temperature 304 at time 310, at approximately 150 seconds. The PF inlet temperature 304 increases after time 310 toward the desired PF inlet temperature. Increasing the desired OC outlet temperature 302 based on feed-back regarding the PF inlet temperature 304, however, delays the time at which the PF inlet temperature 304 reaches the desired PF inlet temperature.

The treatment control module 150 according to the present disclosure monitors the temperature difference between the desired OC outlet temperature 302 and the measured OC outlet temperature (i.e., TB). The temperature correction mapping is updated based on the temperature difference, which are later used for controlling HC injection.

Exemplary trace 312 tracks the adjusted OC outlet temperature that is determined based on the desired OC outlet temperature 302 and the temperature correction. At time zero, the desired OC outlet temperature 302 is adjusted for the temperature correction. Exemplary trace 314 tracks the PF inlet temperature measured while HC is injected based on the adjusted OC outlet temperature 312, which includes the temperature correction. The PF inlet temperature 314 reaches the desired PF inlet temperature near time 316, at approximately 70 seconds.

Adjusting control of HC injection using the temperature corrections controls the PF inlet temperature 314 to the desired PF inlet temperature without plateauing. The PF inlet temperature 314 reaches the desired PF inlet temperature approximately 95 seconds earlier than if using feed-back regarding the PF inlet temperature.

Figure 4:
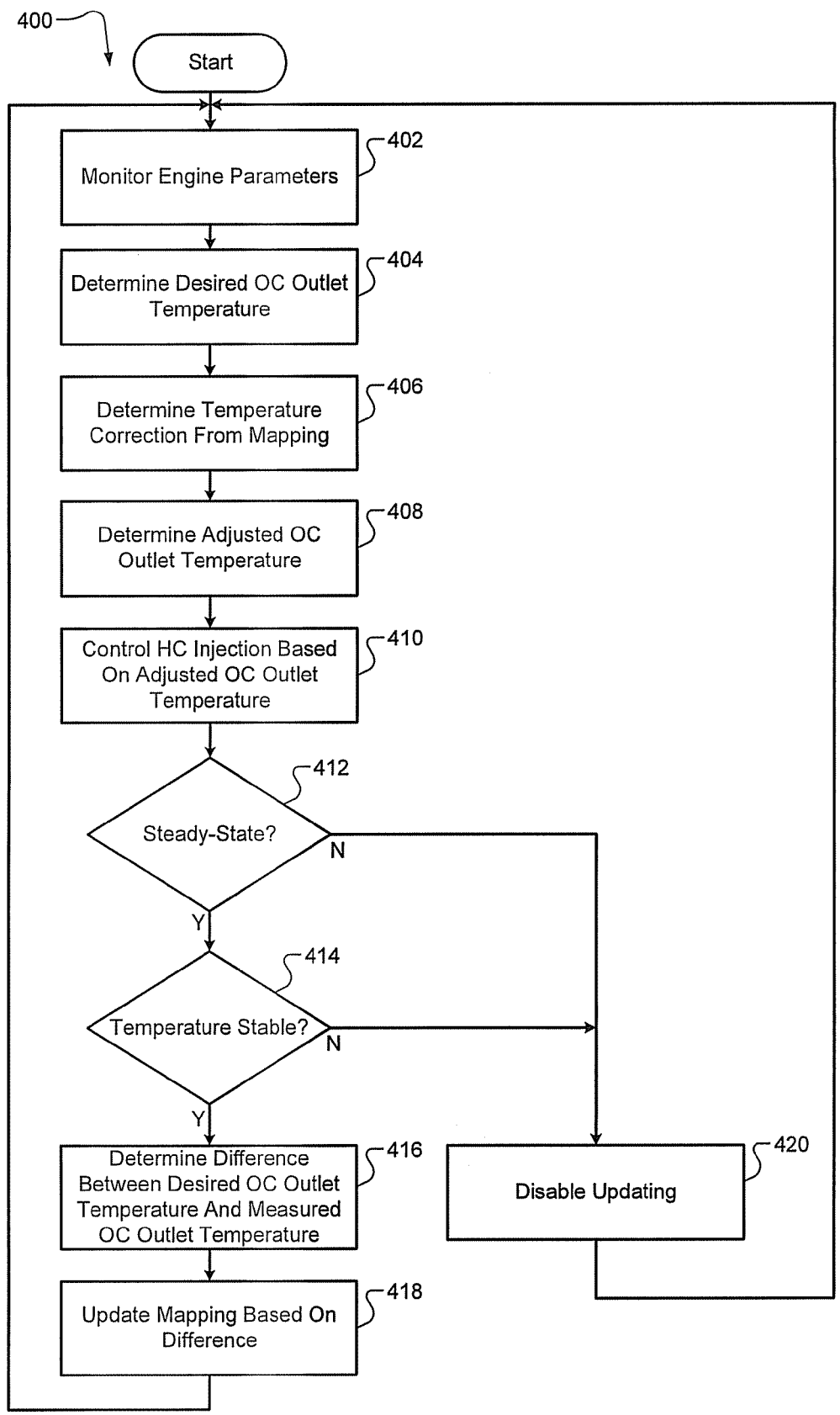
FIG. 4 is a flowchart depicting an exemplary method according to the principles of the present disclosure.

Referring now to FIG. 4, a flowchart depicting an exemplary method 400 is presented. The method 400 begins in step 402 where the method 400 monitors engine parameters, such as the engine speed, the engine load, and/or the EFR. The method 400 determines the desired OC outlet temperature in step 404. The method 400 determines the temperature correction from the temperature correction mapping in step 406. The temperature mapping correction includes temperature corrections indexed by, for example, engine speed, engine load, and/or EFR.

In step 408, the method 400 determines the adjusted OC outlet temperature. The method 400 determines the adjusted OC outlet temperature based on a sum of the desired OC outlet temperature and the temperature correction. The method 400 controls HC injection based on the adjusted OC outlet temperature in step 410. In this manner, HC injection is adjusted for the temperature correction determined in step 406.

The method 400 determines whether the system is in steady-state in step 412. If true, the method 400 proceeds to step 414. If false, the method 400 transfers to step 420. Step 420 is discussed further below. For example only, the method 400 may deem the system in steady-state when the engine speed and the engine load are within respective predetermined ranges for the predetermined period.

In step 414, the method 400 determines whether the temperature is stable. If true, the method 400 continues to step 418. If false, the method 400 transfers to step 420. For example only, the method 400 may deem the temperature stable when the desired OC outlet temperature change and the desired PF inlet temperature change are less than the respective amounts over the predetermined period.

The method 400 determines the temperature difference between the desired OC outlet temperature and the measured OC outlet temperature (i.e., TB) in step 416. The method 400 updates the temperature correction mapping based on the temperature difference in step 418. The method 400 updates (or populates) the entry of the temperature correction mapping for the engine speed and engine load in step 418 based on the temperature difference. The method 400 then returns to step 402. In this manner, the temperature correction may be used in later HC injection control.

Referring to step 420, the method 400 disables updating of the temperature correction mapping in step 420. In this manner, the method 400 disables updating when the system has not yet been deemed in steady-state and/or when the temperature has not yet been deemed stable. Control then returns to step 402.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A temperature control system comprising:
   a temperature determination module that determines a desired outlet temperature for an oxidation catalyst (OC) that is located upstream of a particulate filter (PF) in an exhaust system;
   a temperature correction module that determines a temperature correction from a mapping including a plurality of temperature corrections;
   a temperature control module that controls an outlet temperature of said OC based on said desired outlet temperature and said temperature correction; and
   an updating module that selectively updates said mapping, from which said temperature correction module determines said temperature correction, when an engine speed and an engine load are within respective predetermined ranges.

2. The temperature control system of claim 1 wherein said temperature correction module determines said temperature correction from said plurality of temperature corrections based on said engine speed and said engine load.

3. The temperature control system of claim 1 wherein said temperature correction module determines said temperature correction from said plurality of temperature corrections based on exhaust flow rate.

4. The temperature control system of claim 1 wherein said temperature control module controls said outlet temperature of said OC based on a sum of said desired outlet temperature and said temperature correction.

5. The temperature control system of claim 1 further comprising an injection control module that controls hydrocarbon (HC) injection upstream of said OC to control said outlet temperature of said OC.

6. The temperature control system of claim 1 wherein said updating module selectively updates said at least one of said plurality of temperature corrections of said mapping based on a difference between a measured outlet temperature of said OC and said desired outlet temperature.

7. The temperature control system of claim 6 wherein said updating module updates one of said plurality of temperature corrections that corresponds to said engine speed and said engine load.

8. The temperature control system of claim 1 further comprising an enabling/disabling module that disables said updating module when at least one of said engine speed and said engine load are outside of said respective predetermined ranges.

9. The temperature control system of claim 8 wherein said enabling/disabling module disables said updating module when a change in a desired PF inlet temperature over a predetermined period is greater than a predetermined amount.

10. The temperature control system of claim 8 wherein said enabling/disabling module disables said updating module when a change in said desired outlet temperature over a predetermined period is greater than a predetermined amount.

11. A system comprising:
    the temperature control system of claim 1;
    the OC;
    the PF; and
    a selective catalytic reduction (SCR) catalyst disposed in said exhaust system between said OC and said PF.

12. A temperature control method comprising:
    determining a desired outlet temperature for an oxidation catalyst (OC) that is located upstream of a particulate filter (PF) in an exhaust system;
    determining a temperature correction from a mapping including a plurality of temperature corrections;
    controlling an outlet temperature of said OC based on said desired outlet temperature and said temperature correction; and
    selectively updating said mapping, from which said temperature correction is determined, when an engine speed and an engine load are within respective predetermined ranges.

13. The temperature control method of claim 12 further comprising determining said temperature correction from said plurality of temperature corrections based on said engine speed and said engine load.

14. The temperature control method of claim 12 further comprising determining said temperature correction from said plurality of temperature corrections based on exhaust flow rate.

15. The temperature control method of claim 12 further comprising controlling said outlet temperature of said OC based on a sum of said desired outlet temperature and said temperature correction.

16. The temperature control method of claim 12 further comprising controlling hydrocarbon (HC) injection upstream of said OC to control said outlet temperature of said OC.

17. The temperature control method of claim 12 wherein a selective catalytic reduction (SCR) catalyst is disposed in said exhaust system between said OC and said PF.

18. The temperature control method of claim 12 wherein said selectively updating comprises selectively updating at least one of said plurality of temperature corrections of said mapping based on a difference between a measured outlet temperature of said OC and said desired outlet temperature.

19. The temperature control method of claim 18 wherein said selectively updating comprises updating one of said plurality of temperature corrections that corresponds to said engine speed and said engine load.

20. The temperature control method of claim 12 further comprising disabling said selectively updating when at least one of said engine speed and said engine load are outside of said respective predetermined ranges.

21. The temperature control method of claim 20 further comprising disabling said selectively updating when a change in a desired PF inlet temperature over a predetermined period is greater than a predetermined amount.

22. The temperature control method of claim 20 further comprising disabling said selectively updating when a change in said desired outlet temperature over a predetermined period is greater than a predetermined amount.

23. A temperature control system comprising:
    a temperature determination module that determines a desired outlet temperature for an oxidation catalyst (OC) that is located upstream of a particulate filter (PF) in an exhaust system;

a temperature correction module that determines a temperature correction from a mapping including a plurality of temperature corrections based on exhaust flow rate;

a temperature control module that controls an outlet temperature of said OC based on said desired outlet temperature and said temperature correction; and an updating module that selectively updates said mapping, from which said temperature correction module determines said temperature correction, when an engine speed and an engine load are within respective predetermined ranges.

24. A temperature control method comprising:

determining a desired outlet temperature for an oxidation catalyst (OC) that is located upstream of a particulate filter (PF) in an exhaust system;

determining a temperature correction from a mapping including a plurality of temperature corrections based on exhaust flow rate;

controlling an outlet temperature of said OC based on said desired outlet temperature and said temperature correction; and selectively updating said mapping, from which said temperature correction is determined, when an engine speed and an engine load are within respective predetermined ranges.

* * * * *